J. LE C. DAVIS.
DYNAMO ELECTRIC MACHINE.
APPLICATION FILED DEC. 14, 1908.
969,608.
Patented Sept. 6, 1910.
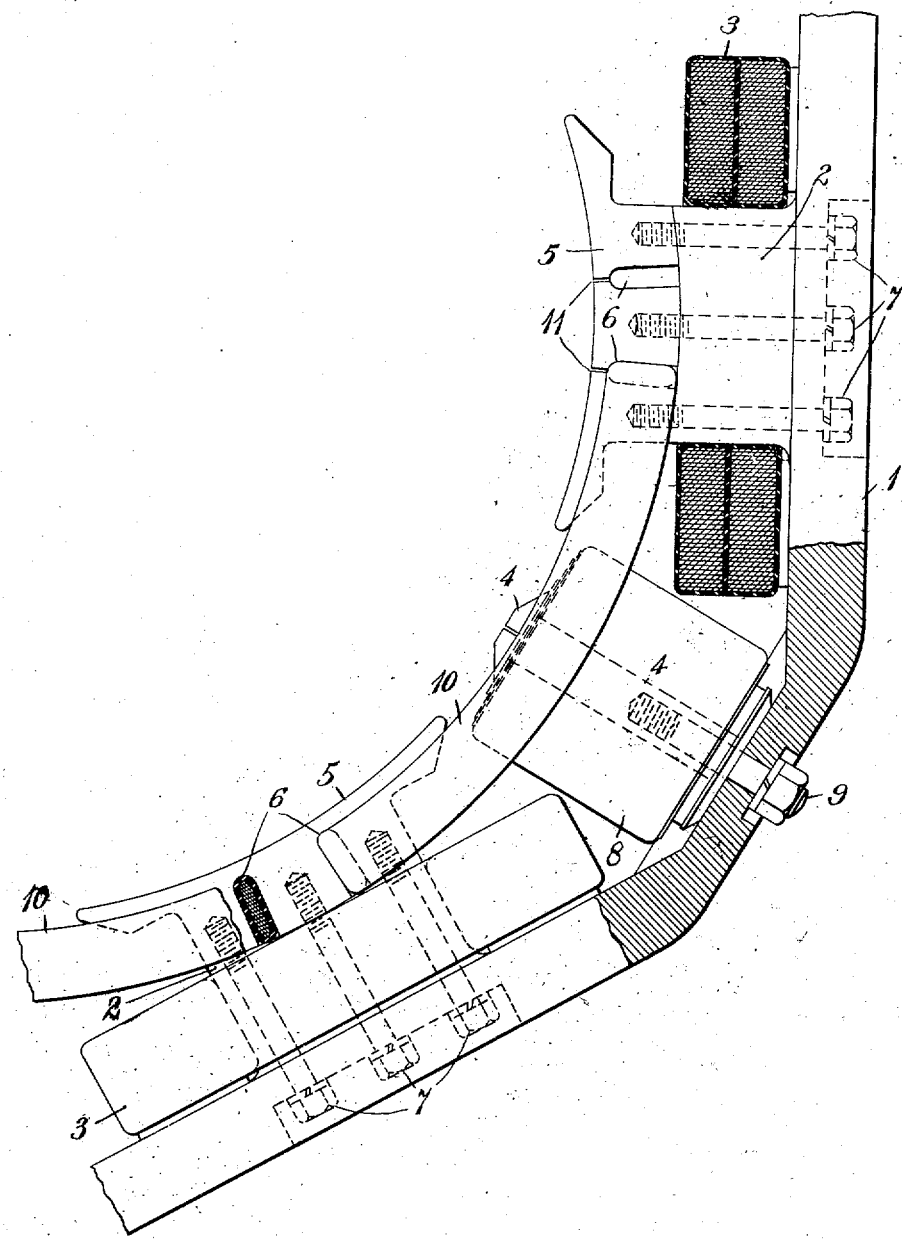

UNITED STATES PATENT OFFICE.

JOSEPH LE CONTE DAVIS, OF PITTSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

969,608.  Specification of Letters Patent.  Patented Sept. 6, 1910.

Application filed December 14, 1908. Serial No. 467,476.

*To all whom it may concern:*

Be it known that I, JOSEPH LE C. DAVIS, a citizen of the United States, and a resident of Pittsburg, in the county of Allegheny and State of Pennsylvania, have invented a new and useful Improvement in Dynamo-Electric Machines, of which the following is a specification.

My invention relates to dynamo-electric machines and it has special reference to such machines as are provided with auxiliary windings for opposing armature reaction and for creating a commutating field.

The object of my invention is to provide an improved field structure, embodying windings of the class above indicated, that shall be simple in construction and effective in operation.

Railway motors and other dynamo-electric machines have frequently been provided with auxiliary poles and windings between the main poles for the purpose of improving the commutation of the machine. In some cases, the intermediate poles and windings have been either replaced or supplemented by interpolar demagnetizing windings disposed in cross slots in the faces of the main polar projections.

According to my present invention, I provide removable extensions for the main polar projections having cross slots that are open at the sides which fit against the ends of the polar projections in order that complete auxiliary coils may be readily inserted in the non-corresponding slots in adjacent extensions and then be supported in operative relation to other parts by merely clamping the extensions against the ends of the polar projections.

The single figure of the accompanying drawing is a view partially in section and partially in elevation of a portion of the field magnet of a dynamo-electric machine embodying my invention.

Referring to the drawing, the structure illustrated comprises a field magnet frame 1 having a plurality of main polar projections 2 and auxiliary polar projections 4. The main polar projections 2 are provided with magnetizing windings 3 and extensions 5 having cross slots 6 which open into the dividing surfaces between the extensions and the faces of the main polar projections. The extensions are held in position by bolts 7 which extend inwardly from the outer surface of the frame. The auxiliary or intermediate polar projection 4 is provided with a coil 8 and is secured to the frame by means of bolts 9. The machine is provided with demagnetizing coils 10 which are disposed in the slots 6 of adjacent poles.

The fact that the polar extensions 5 are detachably secured to the main polar projections 2 is of special importance since it permits of the use of so called "formed coils" which are wound and insulated before they are assembled in position. Since the slots 6 open into the inner surface of the extension 5, the necessity for holding the coils 10 in position by separate supports or braces is obviated, the extensions themselves, when bolted to the ends of the polar projections, serving as a means for efficiently supporting the coils.

It may be found desirable, in some cases, to provide narrow slots or saw cuts 11 between the outer ends of the slots 6 and the outer faces of the extensions in order to obtain partially closed, instead of entirely closed, slots for the coils 10.

While I have illustrated my improved field magnet structure and interpolar winding as associated with auxiliary or intermediate poles and coils, I desire that my invention shall not be restricted to this combination and that only such limitations shall be imposed as are indicated in the appended claim.

I claim as my invention:

A dynamo-electric machine frame having a plurality of polar projections each of which comprises an integral base portion and a cap or extension removably secured to the base portion and having laterally extending pole tips and cross slots, the inner sides of which are closed by the face of the base portion, magnetizing windings for the polar projections, and demagnetizing coils, the side portions of each of which are located in cross slots of adjacent polar projections.

In testimony whereof, I have hereunto subscribed my name this 27th day of November, 1908.

JOSEPH LE CONTE DAVIS.

Witnesses:
EDWARD L. WILDER,
BIRNEY HINES.